United States Patent [19]
Cooper et al.

[11] 3,790,811

[45] Feb. 5, 1974

[54] GROUND REFERENCE NETWORK

[75] Inventors: Phillip V. Cooper, Southfield; Albert E. Brendel, Lake Orion, both of Mich.

[73] Assignee: Lebow Associates, Inc., Troy, Mich.

[22] Filed: Dec. 7, 1972

[21] Appl. No.: 313,143

[52] U.S. Cl.................. 307/94, 73/136 A, 336/120
[51] Int. Cl. .............................................. G01l 3/00
[58] Field of Search ...... 307/119, 94, 103; 336/120, 336/123; 73/136 A; 317/17; 323/45, 44; 332/47; 328/165, 162; 330/149

[56] References Cited
UNITED STATES PATENTS

| | | | |
|---|---|---|---|
| 2,531,228 | 11/1950 | Macgeorge | 73/136 A |
| 3,286,178 | 11/1966 | Ultcht | 323/44 R |
| 2,791,728 | 5/1957 | Traugott | 307/94 X |
| 1,537,371 | 5/1925 | Petersen | 317/17 |
| 3,611,230 | 10/1971 | Maake | 336/120 |

Primary Examiner—Herman J. Hohauser
Assistant Examiner—M. Ginsburg
Attorney, Agent, or Firm—Cullen, Settle, Sloman & Cantor

[57] ABSTRACT

An external ground reference network for a transducer system in which the transducer is coupled by transformers to both the input and output of the system. In one embodiment, the external ground reference network has one portion coupled across the input and another portion coupled across the output and is in a star configuration. In another embodiment, the external ground reference network is a connection between center-taps of the transformers.

8 Claims, 4 Drawing Figures

PATENTED FEB 5 1974 3,790,811
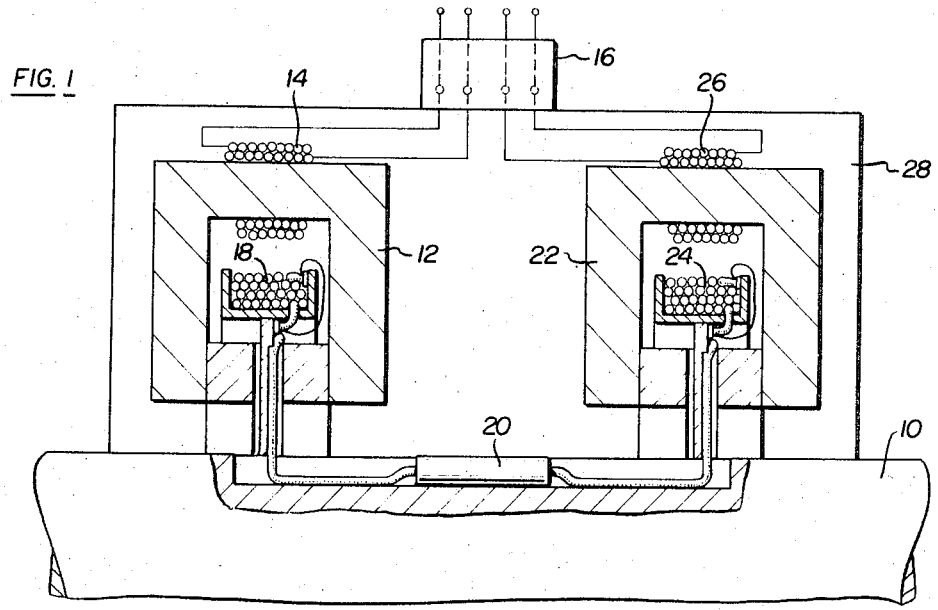
FIG. 1
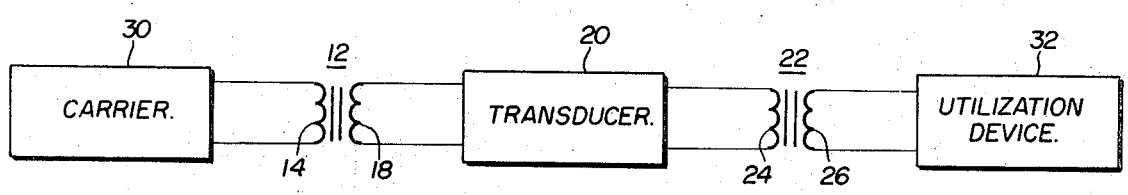
FIG. 2
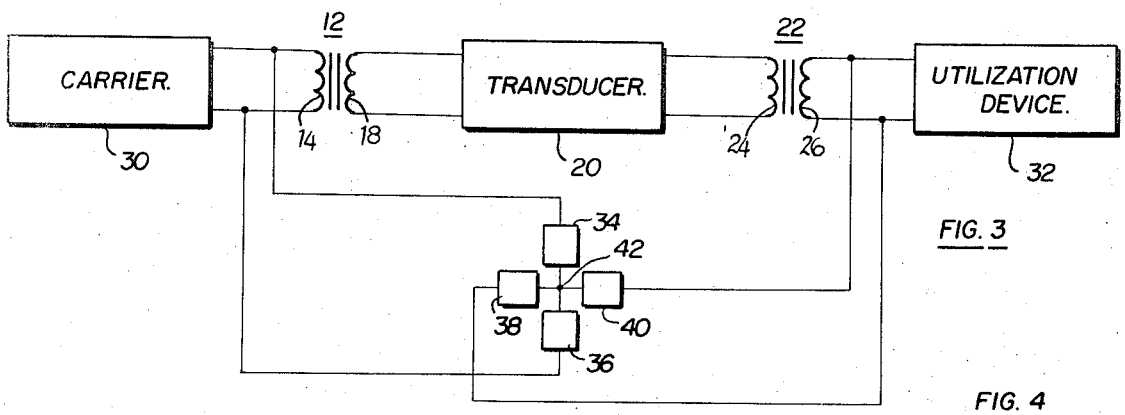
FIG. 3
FIG. 4
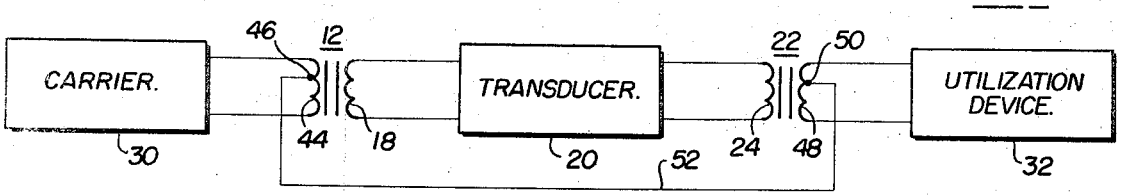

GROUND REFERENCE NETWORK

BACKGROUND OF THE INVENTION

This invention relates generally to alternating current instrumentation which requires a ground reference or direct current return path, such as instrumentation used for torque sensing or measuring. The invention relates specifically to the use of a network external to the sensing circuit to provide a ground reference.

In transducer systems involving the use of alternating current, it is sometimes advantageous to use transformers to couple the transducer to both the input and output. While some of these alternating current or carrier systems require a direct current return path for proper operation, the introduction of a transformer into the system, eliminates this path. That is, the transducer system is floating with respect to the input or power supply and the output or utilization device.

An attempt has been made to solve this problem, in those systems using a strain gage bridge as the transducer, by using an external or dummy bridge in parallel with the strain gage bridge but located on the instrument side of the circuit.

However, there are distinct disadvantages of this prior art technique. First, the dummy bridge must be closely balanced to prevent feedback. Second, the dummy bridge must remain balanced notwithstanding temperature variations. Third, the resistors of the dummy bridge must be of high precision and of equal value or the actual balancing technique used on the strain gage itself must be duplicated on the dummy bridge.

In view of the shortcomings of the prior art attempts to provide a suitable ground reference network for such a system, it is an object of the present invention to provide a new and improved ground reference network.

It is a further object of the present invention to provide a ground reference network which eliminates both feedback and the need for bridge balancing.

It is yet a further object of the present invention to provide, in one embodiment, a ground reference network where the components may be of different values.

BRIEF DESCRIPTION OF THE DRAWINGS

The foregoing objects of the present invention, together with other objects and advantages which may be attained by its use, will become more apparent upon reading the following detailed description taken in conjunction with the drawings. In the drawings, wherein like numerals represent corresponding parts:

FIG. 1 is an illustration, partly in cross-section, of a transducer system wherein the invention may be employed;

FIG. 2 is a schematic illustration of a general circuit for use with a transducer system;

FIG. 3 is a circuit schematic of a transducer system incorporating one embodiment of the present invention; and FIG. 4 is a circuit schematic of a transducer system incorporating another embodiment of the present invention.

DETAILED DESCRIPTION OF THE INVENTION

For a full understanding of the present invention reference will be made to one environment in which the invention has a particular utility. That environment is a transducer system for measuring torque of a rotating member. It must be appreciated, however, that once the broad principles of the present invention are understood, the invention may be utilized in other environments.

Referring first to FIG. 1, a transducer system is illustrated for measuring the torque on a rotatable shaft 10. The input or power supply to the system is coupled to the shaft 10 by a transformer 12 having a stationary winding or primary 14 entering a connecting block 16 and a rotatable winding or secondary 18 connected to a strain gage transducer 20. Also shown is a second transformer 22 having a rotatable winding or primary 24 coupled to the transducer and a stationary winding 26 or secondary entering the connecting block 16. Both transformers and the transducer fit within a housing 28.

The transformers 12 and 22 have rotors which rotate with the shaft 10; hence they are referred to as rotary transformers. The contactless rotary transformer of the type manufactured by Lebow Associates, Inc., of Troy, Mich. as disclosed by U.S. Pat. No. 3,611,230, assigned to the assignee of the present invention, is preferred.

Referring to FIG. 2, a carrier or source of alternating current 30 is coupled to the primary winding 14 of the first transformer 12. For ease of reference this is referred to as the system excitation. The secondary winding 26 of the second transformer 22 couples the output voltage to an output or utilization device 32. This is referred to as the system signal. It must be appreciated at this time that a single "instrument" can provide the function of a carrier and a utilization device and in fact such instrument may be calibrated to provide an output reading of the property to be measured by the transducer system.

Upon inspection of FIG. 2, it must be realized that the input and output are "floating". That is, there is no ground reference or direct current return path for the system.

In order to provide for a ground reference without the attendant disadvantages of the prior art, the circuit of FIG. 3 may be utilized. The circuit of FIG. 3 is configured as a star or crossed-arm network and includes a first series circuit portion of impedances 34 and 36 connected in parallel across the carrier 30. The star network also includes a second series circuit portion comprising impedances 38 and 40 coupled in parallel across the output or utilization device 32. The two portions of the star network are interconnected to provide a common junction 42 between the four impedances.

It is noted that the two portions of the star or crossed-arm network are connected across the primary of the excitation transformer and across the secondary of the signal transformer, respectively.

Since all four impedance elements have a common junction or point of equal potential 42, a current cannot flow in one circuit due to a voltage across the other circuit. This does away with the need for balancing and provides a direct path from the carrier to the utilization device. Thus the utilization device is no longer floating with respect to the carrier. Also, since current cannot flow in one arm due to a voltage in the other, there is no feedback and balancing is no longer required in the star network. As a result, normal tolerance components of unequal impedances may be used which provides an advantage when considering the design loading requirements of a transformer system.

FIG. 4 illustrates another embodiment for providing a direct current return path without the need for additional balancing, feedback compensation or temperature compensation.

In FIG. 4, the excitation or input transformer 12 has a stationary or primary winding 44 with a center tap 46. The signal or output transformer 22 has a stationary or secondary winding 48 also with a center tap 50. The two center taps are electrically connected such as by a lead 52. By utilizing center-tapped transformer windings, balancing and feedback problems are eliminated.

The present invention has been explained in the environment of a rotating shaft with a strain gage placed on the shaft for measuring shaft torque. It must be appreciated, however, that the present invention may be utilized in other transformer systems to provide a direct current return path and prevent the input and output devices from being floating relative to each other.

It is to be further appreciated and understood that the transducer need not be a strain gage but may take other forms such as a general potentiometric circuit wherein a change in resistance, current or voltage is detected.

Therefore, the foregoing is a description of two embodiments of the present invention and should not be read in a restricted sense but only as describing the underlying concept of the present invention. The invention may be further developed within the scope of the following claims.

What is claimed is:

1. An alternating current system comprising: first and second transformers, each having a primary winding and a secondary winding, a transducer coupled to the secondary winding of the first transformer and coupled to the primary winding of the second transformer, and ground reference means for providing a direct current flow return path from the primary winding of said first transformer to the secondary winding of said second transformer and from the secondary winding of said second transformer to the primary winding of said first transformer, said ground reference means preventing feedback between said first and second transformers.

2. The improvement of claim 1 wherein the primary winding of said first transformer and the secondary winding of said second transformer each have a center-tap, and said ground reference means is a direct connection between said center-taps.

3. The improvement of claim 1 wherein the ground reference means includes a first portion connected across the primary winding of said first transformer and a second portion connected across the secondary winding of said second transformer.

4. The improvement of claim 3 wherein said first and second portions are interconnected in a crossed-arm configuration.

5. The improvement of claim 3 wherein said first and second portions each include first and second impedances and said first and second portions are interconnected between the first and second impedance of each to form a star circuit.

6. The improvement of claim 5 wherein said transducer is a strain gage bridge.

7. The improvement of claim 5 wherein said transducer is a potentiometric circuit.

8. A direct current return path for use in a system for measuring the torque on a member including a transducer on said member responsive to said torque, said transducer being transformer-coupled to both a source of power and an output device, said direct current return path comprising:

first impedance means connected in parallel across said power source, second impedance means connected in parallel across said output device, and said first and second impedance means being interconnected for providing a junction of equal potential.

* * * * *